United States Patent [19]

Williams

[11] 4,075,915
[45] Feb. 28, 1978

[54] CENTERING APPARATUS

[76] Inventor: Lionel Williams, 14733 Winchester, Harvey, Ill. 60426

[21] Appl. No.: 570,190

[22] Filed: Apr. 21, 1975

[51] Int. Cl.² .............................................. B23B 23/02
[52] U.S. Cl. .................................................... 82/33 R
[58] Field of Search ...................... 82/45, 33 R, 33 A; 51/238 R

[56] References Cited

U.S. PATENT DOCUMENTS

| | | | |
|---|---|---|---|
| 1,479,952 | 1/1924 | Boyce | 82/33 |
| 1,956,305 | 4/1934 | Baninger | 82/33 |
| 2,397,371 | 3/1946 | Reynolds | 82/33 R |
| 3,618,434 | 11/1971 | Nault | 82/45 |

FOREIGN PATENT DOCUMENTS 911,161   7/1946   France .................................. 82/33

Primary Examiner—Francis S. Husar
Assistant Examiner—William R. Briggs

[57] ABSTRACT

A centering tool for rotary machine tools such as lathes and the like having axially aligned stocks comprising an end for engaging a workpiece in such a way that the engagement zone is substantially frusto-conical in configuration so that a workpiece having a centering recess disposed at an angle to the intended axis of the workpiece may be grasped so that machining can be accomplished about an axis in close proximity to the real axis so that a minimum of material is wasted.

2 Claims, 9 Drawing Figures

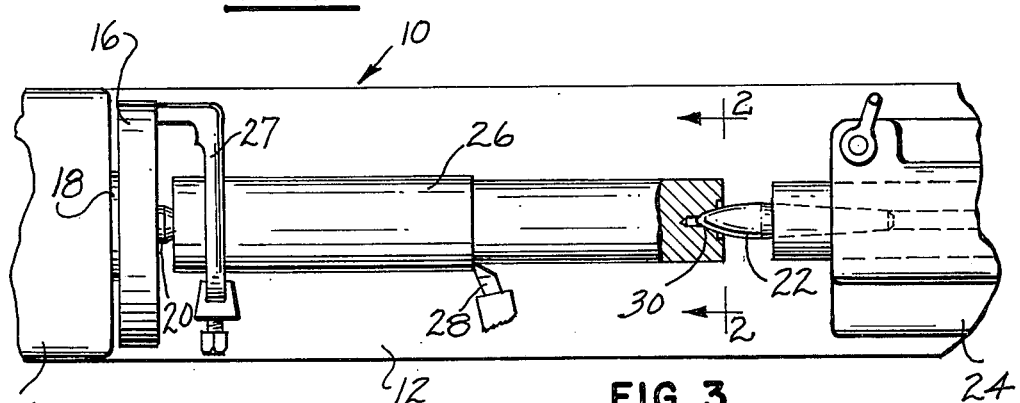
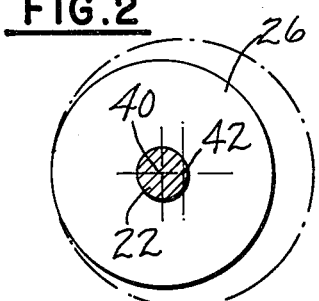
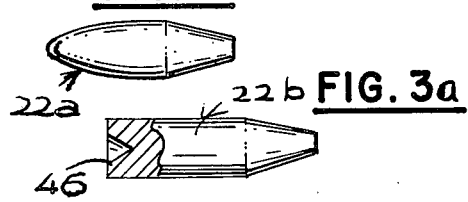
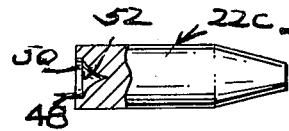
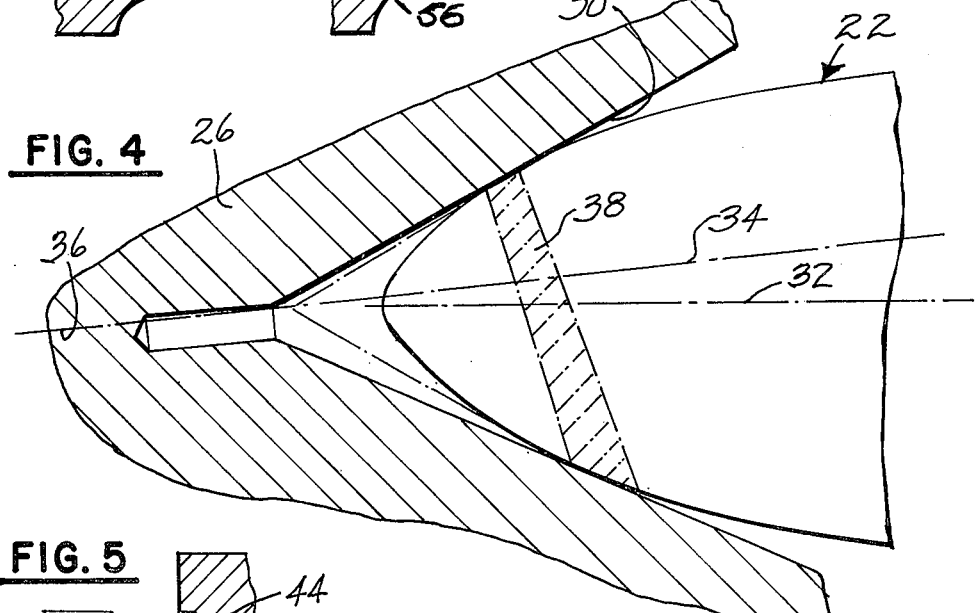
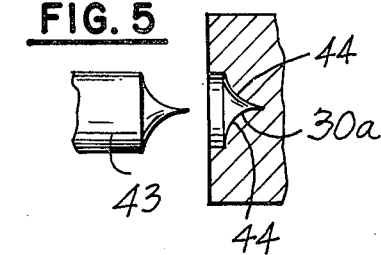

CENTERING APPARATUS

SUMMARY OF THE INVENTION

The present centering device is intended to cure gross inaccuracies when a workpiece center is inadvertently disposed at an angle with respect to the axis of the workpiece. In the principal form of the present device the centering tools of both headstock and tailstock are formed convexly in such a way that frusto-conical engagement is afforded at each end so that errors in centering the workpiece recess are minimized and a symmetrical workpiece is produced whether or not the workpiece centers are true.

A principal object of the invention is to provide a mechanism for automatically centering lathe workpieces so that the workpiece is machined symmetrical about an axis coincident with the axis of the headstock and the tailstock.

Another object of the invention is to provide a mechanism of the stated type wherein a minimum of asymmetrical cutting is required to effect trueing of the workpiece.

Another object of the invention is to provide a mechanism in accordance with the preceding objects wherein the errors at the ends of a workpiece minimize each other.

These and other objects will become apparent as the description proceeds with reference to the accompanying drawing wherein:

BRIEF DESCRIPTION OF THE DRAWING

FIG. 1 is a plan view of a lathe embodying the centering mechanism of the present invention;

FIG. 2 is a greatly enlarged view taken substantially on line 2—2 of FIG. 1;

FIG. 3 is an elevational view of a stock made in accordance with the present invention;

FIG. 3a is a view similar to FIG. 3 but showing a modified form of the present invention;

FIG. 3b is a view similar to FIG. 3 but showing a further modified form of the present invention;

FIG. 4 is a greatly enlarged elevational fragmentary sectional view illustrating the engagement zone when the workpiece center is angularly displaced from the axis of the workpiece;

FIG. 5 illustrates a modified form of the present invention wherein the workpiece has a curved surface for engagement by a conical centering tool with the same result as the principal form of the invention;

FIG. 6 is an elevational fragmentary sectional view of a tool which may be used to form the centering recesses of a workpiece to receive the conical ends of a conventional centering tool and may also be used to form a centering tool recess of the type shown in FIG. 3b; and FIG. 7 illustrates a tool which upon rotation is capable of forming a centering tool recess of the type illustrated in FIG. 3b.

DESCRIPTION OF THE PREFERRED EMBODIMENTS

Referring now to the drawing and more particularly to FIG. 1, there is illustrated therein a lathe generally indicated by reference numeral 10 and having a bed 12, a housing 14, a face plate 16, a shaft 18, a headstock 20, a tailstock 22, and an axially movable carriage 24. Between the stocks 20 and 22 is illustrated a workpiece 26 in the process of being machined by a cutting tool 28.

The present invention is occasioned by the fact that workpieces such as the workpiece 26 illustrated must be mounted on the lathe by means of a center recess 30 as illustrated in FIGS. 1 and 4. It will be appreciated that the workpiece 26 is rotated by means of a conventional dog 27. Prior art lathes have headstocks and tailstocks having conical heads or centering tools for reception in correspondingly formed recesses in the workpiece. Such a head would be adequate if each recess 30 were formed about an axis coincident with the axis of the workpiece. Oftentimes, however, the recess 30 is displaced so that its axis is angularly disposed with respect to the axis of the workpiece and the axis of the associated center. For instance, in FIG. 4, reference numeral 32 indicates the axis of the tailstock 22 while reference numeral 34 indicates the axis of the recess 30. It will be noted that reference numeral 36, the axis of the workpiece 26, is coincident with the axis 32. In the relationship illustrated in FIG. 4, the curvature of the head of the stock 22 produces a zone of engagement 38 which is substantially frusto-conical. It will be appreciated that if the axis 34 were coincident with the axis 32, the engagement zone 38 would be symmetrical.

The important aspect of the engagement zone 38 is that it may vary in its specific configuration to accommodate various irregularities in the formation of the recess 30. For instance, if the axis 34 were on the opposite side of the axis 32, the zone of engagement 38 would be wider at the top than at the bottom but the axis 36 would still be coincident with the axis 32.

As noted in FIG. 2, in an exaggerated sense, the initial turns of the workpiece will produce a cutting of the periphery of the workpiece to bring about a symmetrical condition with respect to center 40 of the centering tool rather than center 42 of the recess, both center locations being exaggerated for purposes of clarity.

FIG. 3 shows at 22a a slight modification of the centering tool 22 in that the trailing end is somewhat shortened. In FIG. 3a is illustrated a further modified form of centering tool 22b in which the left end is untapered and is formed with a conical recess 46 for reception of a workpiece having rounded ends. FIG. 3b illustrates a centering tool 22c, similar to the centering tool of 22a but having a recess 48 comprising a bore 50 and a cone-like recess 52 having slightly convex surfaces for reception of workpieces having conical ends.

FIG. 6 illustrates a drill bit 54 for forming a recess of the general type illustrated in FIG. 1. In FIG. 7 is illustrated a drill bit 56 for forming recesses of the type illustrated in FIGS. 3b and 5.

In FIG. 5 is illustrated a modified form of the invention in which a recess 30a is formed in the end of the workpiece such as, for instance, by a tool 43 which produces a convex surface 44. The convex surface 44 may be engaged by a conventional conical head of a typical tailstock to obtain the substantially frusto-conical engagement of the principal form of the invention.

The centering mechanism of the present invention exhibits important advantages over centering mechanisms heretofore known. For instance, the end of a workpiece will assume a predetermined attitude with respect to the end of the stock and maintain that particular attitude during the entire machining operation despite the fact that the axis of the recess may not be coincident with the axis of the stock and the axis of the workpiece. The present centering mechanism is advantageous in that axial displacements of the workpiece recesses are minimized by the fact that they may be engaged in different ways by the associated stocks. This is in contrast to the conventional engagement of corresponding conical surfaces which have had tendency to exaggerate any error in the workpiece recess with the result that the workpiece must be re-centered for machining with consequent loss of time and money. FIGS. 1, 2, and 3 illustrate the preferred form of the invention in which the ends of the stocks are convexly formed to produce the engagement described. It will be apparent that an equivalent engagement may be afforded by the form of the invention illustrated in FIG. 5.

I claim:

1. A centering mechanism for a rotary machine tool such as a lathe or the like, having a pair of opposed confronting stocks, a centering tool mounted in each of said stocks, at least one of said centering tools being symmetrically convex and substantially parabolically shaped to effect engagement with a recess in a work piece, said workpiece having a recess in each end thereof, in a substantially frusto-conical zone in such a way that the axis of the work piece is coincident with the axis of the stock even if the axis of the work piece recess bears an angular relation to the axis of the work piece.

2. A mechanism in accordance with claim 1 wherein the area of the zone of engagement increases when the axis of the work piece center is not coincident with the axis of the work piece.

* * * * *